US008355362B2

(12) United States Patent
Ryu

(10) Patent No.: US 8,355,362 B2
(45) Date of Patent: Jan. 15, 2013

(54) CHANNEL MANAGEMENT FOR MOBILE MULTIMEDIA TERMINAL

(75) Inventor: Song-Pil Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 1092 days.

(21) Appl. No.: 11/273,955

(22) Filed: Nov. 14, 2005

(65) Prior Publication Data

US 2006/0104237 A1 May 18, 2006

(30) Foreign Application Priority Data

Nov. 13, 2004 (KR) ........................ 10-2004-0092841

(51) Int. Cl.
*H04W 4/00* (2009.01)

(52) U.S. Cl. ... 370/328; 455/3.03; 455/3.04; 455/414.1; 455/414.2; 455/414.3; 455/414.4

(58) Field of Classification Search ................. 455/3.03, 455/3.04, 414.1–414.4
See application file for complete search history.

(56) References Cited

U.S. PATENT DOCUMENTS

| | | | | |
|---|---|---|---|---|
| 5,844,620 | A * | 12/1998 | Coleman et al. | 725/54 |
| 6,963,725 | B2 * | 11/2005 | Kato | 455/3.04 |
| 2002/0054087 | A1 * | 5/2002 | Noll et al. | 345/744 |
| 2002/0097340 | A1 * | 7/2002 | Takagi et al. | 348/569 |
| 2003/0135854 | A1 * | 7/2003 | Lee | 725/38 |
| 2005/0020238 | A1 * | 1/2005 | Eastman et al. | 455/403 |
| 2005/0070279 | A1 * | 3/2005 | Ginzburg et al. | 455/434 |

FOREIGN PATENT DOCUMENTS

| | | | |
|---|---|---|---|
| CN | 1419782 | | 5/2003 |
| CN | 1545311 | A | 11/2004 |
| EP | 1 043 851 | A2 | 10/2000 |
| EP | 1 603 258 | A2 | 12/2004 |
| JP | 6141250 | | 5/1994 |
| JP | 7240668 | | 9/1995 |
| JP | 2000-101466 | | 4/2000 |
| JP | 2000-295125 | | 10/2000 |
| JP | 2002-232797 | | 8/2002 |
| JP | 2003-133913 | | 5/2003 |
| JP | 2004-179716 | | 6/2004 |

* cited by examiner

*Primary Examiner* — Wayne Cai
*Assistant Examiner* — Shantell L Heiber
(74) *Attorney, Agent, or Firm* — Lee, Hong, Degerman, Kang & Waimey

(57) ABSTRACT

A method for managing channels in a mobile multimedia terminal comprises receiving ensemble information associated with a multimedia channel, and identifying the multimedia channel into a plurality of services based on the ensemble information. The method also comprises identifying service components required for reception of the plurality of services. The method also comprises determining a service type of each of the plurality of services, and organizing the plurality of services based on service types. The organizing of the plurality of services based on the service types may further comprise receiving user service preference input from a user, and organizing the plurality of services based on the user service preference input.

44 Claims, 9 Drawing Sheets

CHANNEL MANAGEMENT FOR MOBILE MULTIMEDIA TERMINAL

CROSS-REFERENCE TO RELATED APPLICATIONS

Pursuant to 35 U.S.C. §119(a), this application claims the benefit of earlier filing date and right of priority to Korean Application No. 2004-0092841, filed on Nov. 13, 2004, the contents of which are hereby incorporated by reference herein in their entirety.

FIELD OF THE INVENTION

The present invention relates generally to a mobile multimedia terminal and, more particularly, to broadcast channel management for a mobile multimedia terminal.

BACKGROUND OF THE INVENTION

Digital multimedia broadcasting (DMB) provides an audio service and a video service to a plurality of channels. Using DMB, multimedia information and/or data may be received by user with a DMB receiver while the user is moving. Two types of DMB are a terrestrial DMB (TDMB) and a satellite DMB. The terrestrial DMB and the satellite DMB use different channel management methods, respectively. Described below is a method for channel management in a terrestrial DMB.

To manage channels, separated frequency blocks are allocated to various broadcasting providers. Each of the broadcasting providers, in turn, divides the allocated frequency block and allocates a plurality of video channels, audio channels, and/or data channels to the subdivided frequency block. As such, one frequency block is divided to allocate several channels. The channels associated with one frequency block are referred to as an ensemble.

Ensemble information for all frequency blocks is analyzed at the time of an initial driving of the TDMB receiver. Then, configuration information contained in the ensemble information for viewable channels is obtained. The configuration information is then managed as channel information by, for example, a service center or a salesman at the time of an initial purchase of the terrestrial DMB. The configuration information for all channels is stored in table form or in database form, such that necessary channel selection information is continuously provided to the user.

FIG. 1 is a diagram illustrating a channel list for setting a terrestrial DMB channel.

Referring to FIG. 1, the user verifies a list of viewable channels and selects a desired channel for viewing. Thereafter, the channel list is either not displayed, or is displayed only in response to a specific menu selection. In response to channel selection, contents of a currently selected channel are displayed. Thus, the user performs channel switching based on the channel list. That is, the user selects the desired channel by scanning the channel list, using direction keys (e.g., up-down arrow keys), or by inputting a channel number directly.

Since the channel list is automatically generated based on the ensemble, and due to characteristics of the terrestrial DMB, television broadcasting channels, radio broadcasting channels, and data channels are mixed together. Therefore, the user may become frustrated or confused by the mixed channel lists, especially due to the length of time required for scanning through all channels in the channel list.

SUMMARY OF THE INVENTION

Accordingly, the present invention is directed to broadcast channel management for a mobile multimedia terminal that substantially obviates one or more problems due to limitations and disadvantages of the related art.

An object of the present invention is to provide a channel information database (DB) using channel configuration information of broadcasting channels obtained by a mobile multimedia terminal and channel management information that reflects a user setting.

Another object of the present invention is to provide an index table for sorting user preference channels based on the channel information DB to facilitate channel switching.

Still another object of the present invention is to provide for channel management by a user, using the channel information DB and the index table.

Still another object of the present invention is to sort channels based on channel type.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method for managing channels in a mobile multimedia terminal comprises receiving ensemble information associated with a multimedia channel, and identifying the multimedia channel into a plurality of services based on the ensemble information. The method also comprises identifying service components required for reception of the plurality of services. The method also comprises determining a service type of each of the plurality of services, and organizing the plurality of services based on service types.

The organizing of the plurality of services based on the service types may further comprise receiving user service preference input from a user, and organizing the plurality of services based on the user service preference input. The organizing of the plurality of services based on the service types may also further comprise constructing a channel information database associated with the plurality of services based on the organizing of the plurality of services based on the service types, and forming an index table based on the channel information database. The method may further comprise providing the index table to a user to enable user channel switching. The service types may comprise a video channel type, an audio channel type, and a data channel type. The method may further comprise constructing a channel information database associated with the plurality of services based on the organizing of the plurality of services based on the user service preference input.

The method may further comprise performing the user channel switching in response to user input received via a direction key on a keypad. The method may also further comprise performing the user channel switching in response to user input of a channel number on a keypad. The mobile multimedia terminal may comprise a terrestrial digital multimedia broadcasting (TDMB) receiver.

In another embodiment, a method for managing channels in a mobile multimedia terminal comprises receiving ensemble information associated with a multimedia channel, and identifying the multimedia channel into a plurality of services based on the ensemble information. The method also comprises identifying service components required for reception of the plurality of services. The method also comprises receiving user service preference input from a user, and organizing the plurality of services based on the user service preference input.

The organizing of the plurality of services based on the user service preference input may further comprise constructing a channel information database associated with the plurality of services based on the organizing of the plurality of services based on the user service preference input, and forming an index table based on the channel information database. The method may further comprise determining a service type of each of the plurality of service, organizing the plurality of services based on service types, and constructing the channel information database associated with the plurality of services based on the organizing of the plurality of services based on the service types.

In yet another embodiment, a mobile multimedia terminal comprises a controller (e.g., microprocessor) adapted to receive ensemble information associated with a multimedia channel, to divide the multimedia channel into a plurality of services based on the ensemble information, and to identify service components required for reception of the plurality of services. The mobile multimedia terminal also comprises a first memory adapted to store a channel information database, the channel information database associated with the plurality of services. The mobile multimedia terminal also comprises a second memory adapted to store an index table, the index table formed based on the channel information database and provided to a user to enable the user to designate preferred services. The controller is adapted to control the index table based on the preferred services.

The channel information database may comprise a field adapted to designate a service type, and a history field adapted to store a service indicator to enable a previously broadcast service to be rebroadcast after the mobile multimedia terminal is reset. The channel information database may also comprise a preset field adapted to indicate whether a service is a preferred service or a non-preferred service, and a user set field adapted to set a specific service to be broadcast when the mobile multimedia terminal is reset.

The first memory may comprise a non-volatile memory. The second memory may comprise a volatile memory, such as a random access memory (RAM). The mobile multimedia terminal may further comprise a display unit adapted to display a service list stored in the index table, and a keypad comprising a direction key, the direction key adapted to enable the user to perform channel switching based on the service list. The mobile multimedia terminal may comprise a terrestrial digital mulitmedia casting (TDMB) receiver.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention may be implemented in conjunction with various multimedia broadcast technologies, such as digital multimedia broadcasting (DMB) systems. Such DMB systems include terrestrial digital multimedia broadcasting (TDMB) systems and satellite digital multimedia broadcasting (SDMB) systems. The present invention may also be implemented in communication systems operating according to other standards, such as digital video broadcasting handheld (DVB-H), and/or media-forward link (MEDIA-FLO) systems. The mobile multimedia terminal described herein is a portable multimedia receiver that may be implemented as a stand alone unit (such as in an automobile), or may be incorporated into a mobile telephone, for example. Although the term TDMB receiver is used to describe the invention below, any type of mobile multimedia terminal may be used.

Fast channel switching to a user-selected channel and channel management using a channel information database (DB) is described herein. To construct the channel information database channel management information is added to channel configuration information associated with related broadcasting channels, as obtained by a mobile multimedia terminal (e.g. a TDMB receiver). User preferred channels (e.g., user preference channels) are sorted based on the channel information DB, and an index table is constructed accordingly.

Figure 2:
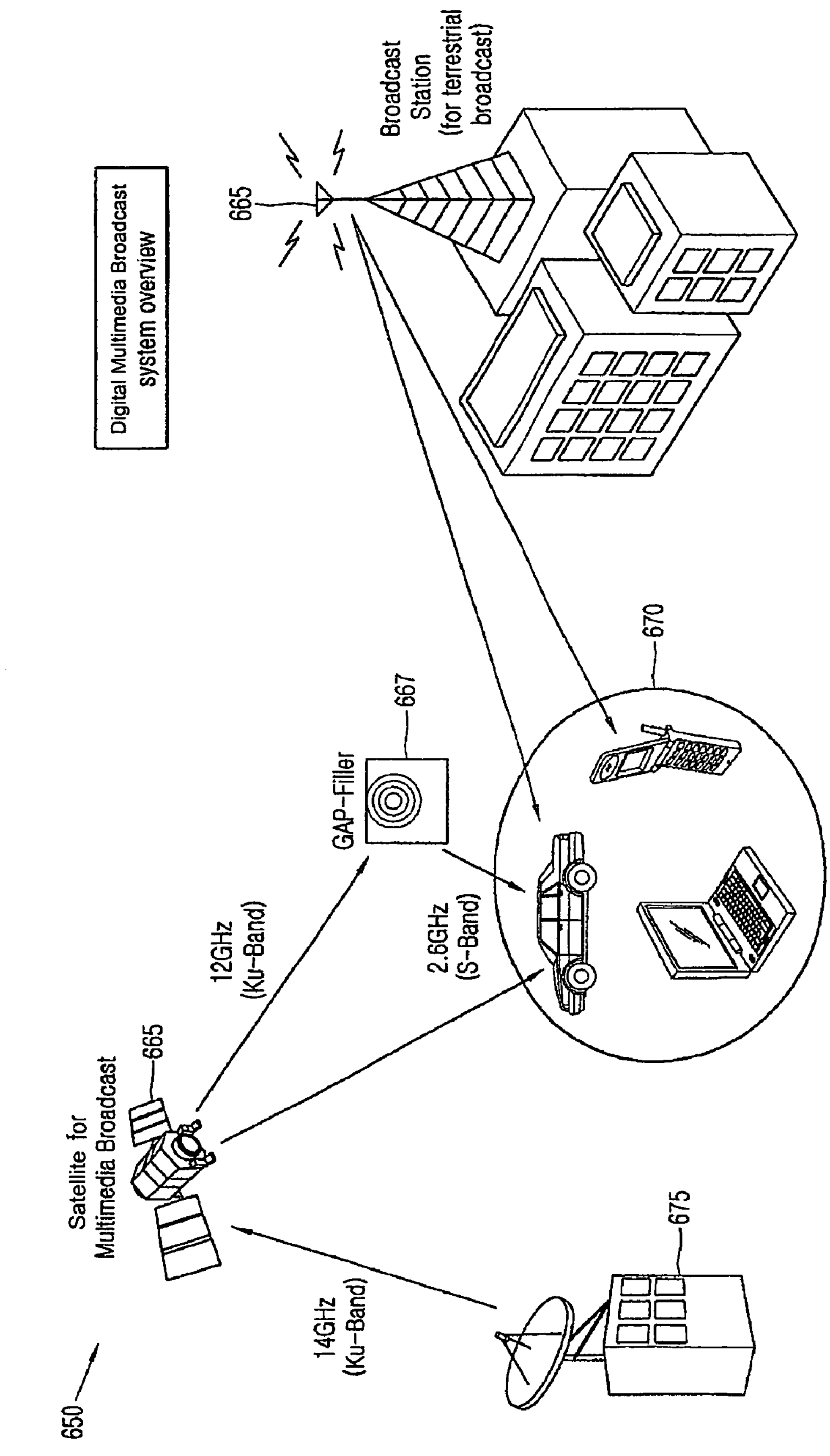
FIG. 2 is a diagram illustrating a multimedia broadcast system, according to an embodiment of the present invention.

FIG. 2 is a diagram illustrating a multimedia broadcast system 650.

Referring to FIG. 2, a system overview is provided of a multimedia broadcast system 650. The multimedia broadcast system 650 includes a terrestrial broadcast station 655 for terrestrial broadcasts (e.g., TDMB broadcasts). The multimedia broadcast system 650 also includes a satellite broadcast station 665 for satellite broadcasts (e.g., SDMB broadcasts). The multimedia broadcast system 650 also includes a mobile multimedia terminal 670 for receiving the broadcasts from the terrestrial broadcast station 655 and/or the satellite broadcast station 665. The mobile multimedia terminal 670 may be embodied in an automobile, a mobile telephone, or a personal digital assistant (PDA), for example, as shown in FIG. 2. The multimedia broadcast system 650 may also include a GAP filler 667 to enhance communication between the satellite broadcast station 665 and the mobile multimedia terminal 670, for example in 'weak signal' areas, and/or a terrestrial broadcast station 675 for communicating with the satellite broadcast station 665, such as to transmit a television signal to the satellite broadcast station 665 to enable satellite based broadcast of the television signal to mobile multimedia terminals.

Figure 3:
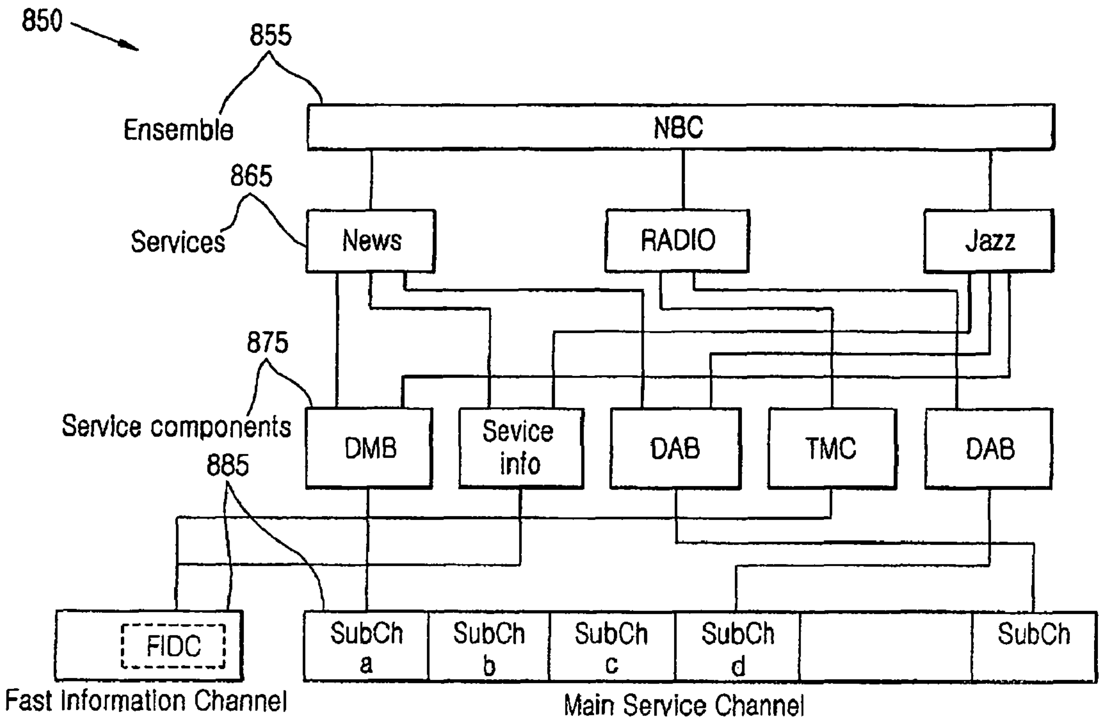
FIG. 3 is a diagram illustrating a framework for provision of multimedia services, according to an embodiment of the present invention.

FIG. 3 is a diagram illustrating a framework 850 for provision of multimedia services, according to an embodiment of the present invention.

Referring to FIG. 3, the framework 850 includes an ensemble level 855 for identifying broadcast stations, such as a television channel (e.g., NBC®). The framework 850 also includes a services level 865, which in turn includes the types of services provided by the broadcast station (e.g., news and/or music). The services offered at the services level 865 may be generated by subdividing the ensemble level 855. For example, as shown in FIG. 3, the television channel NBC® is subdivided into three services or 'subchannels', i.e. 'News', 'Radio', and 'Jazz' 865. The framework 850 also includes a service components level 875 for informing the mobile multimedia terminal of which component (e.g., software) to use to decode the selected service. For example, to decode the 'News' service of the services level 865, the 'DMB', 'Service Info', and 'DAB' service components 875 are required, as shown in FIG. 3. The framework 850 also includes a channel level 885, which in turn includes a fast information channel and a main service channel. The channel level 885 includes data packets with headers associated with service components 875 for provision of the services to the user.

Figure 4:
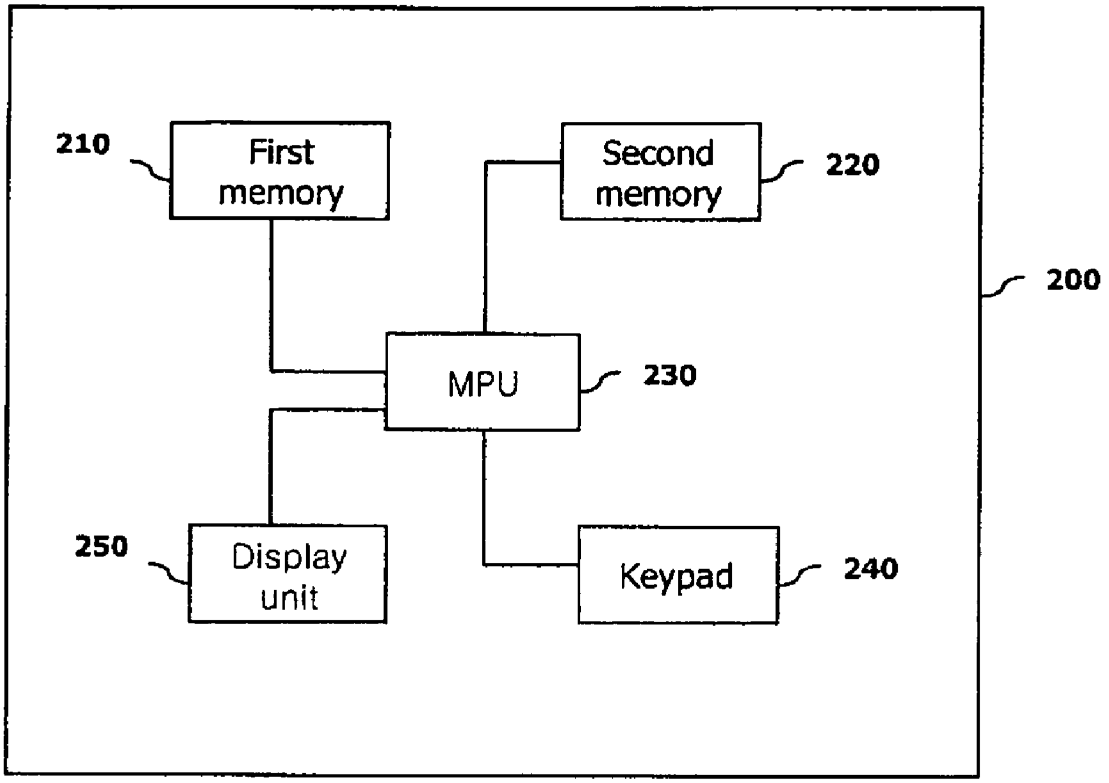
FIG. 4 is a diagram illustrating a schematic view of an apparatus adapted to manage broadcasting channels, according to an embodiment of the present invention.

FIG. 4 is a diagram illustrating a schematic view of an apparatus adapted to manage broadcasting channels, according to the first embodiment of the present invention.

Referring to FIG. 4, a broadcasting channel management apparatus 200 of a mobile multimedia terminal (e.g., a TDMB receiver) comprises a display unit 250, a keypad 240 having numeric keys and a direction key for performing channel switching, a first memory 210, a second memory 220, and a microprocessor unit (MPU) 230. In the first memory 210, a channel information DB associated with all broadcasting channels received by the TDMB receiver is constructed and an information table related to each channel is stored by operation of a computer program, for example, to which algorithms associated with the present invention are applied by the MPU 230. In the second memory 220, an index table for performing channel switching and channel management by sorting user preference channels based on the channel information DB stored in the first memory is constructed, and a memory address of a channel information DB corresponding to each sorted channel is stored. The microprocessor unit 230 performs a control operation to construct the channel information DB and construct an index table for performing channel switching and channel management according to the user preference based on the constructed channel information DB.

Figure 5:
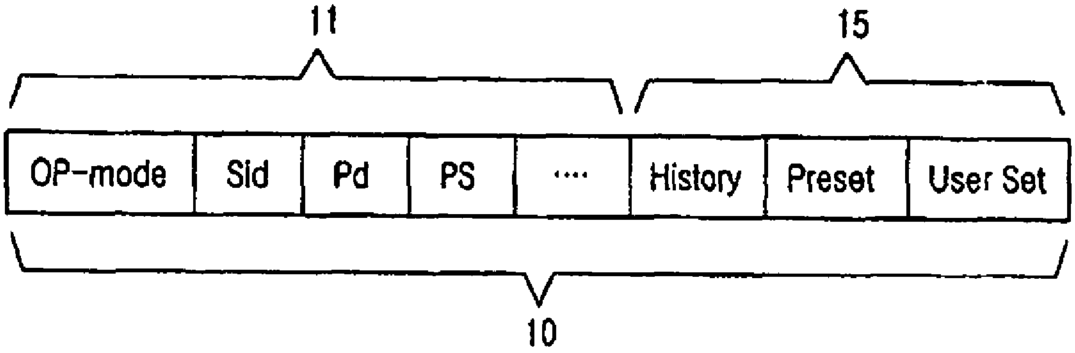
FIG. 5 is a diagram illustrating a channel information data format, according to an embodiment of the present invention.

FIG. 5 is a diagram illustrating a channel information data format, according to an embodiment of the present invention.

Referring to FIG. 5, the data format includes channel unit configuration information 10. The channel unit configuration information 10, in turn, includes channel configuration information 11 and channel management information 15. The channel configuration information 11 is obtained from information related to broadcasting channels by analyzing ensemble information when the TDMB receiver is initially operated as a channel unit. The channel management information 15 is used to manage channels by reflecting a user setting. As the configuration information 11 and the management information 15 associated with a channel are constructed as a unit, a channel information database for related channels is formed and a channel information DB is constructed. The channel information database may be stored in the first memory 210 (e.g., a flash ROM), for example. As described with reference to FIG. 3 below, a channel information database 20 may include channel unit configuration information 10 for related channels.

The channel configuration information 11 may include a channel setting field. Information associated with each field may be provided by broadcasting providers, for example. The fields in the channel configuration information 11 may be set, as necessary. Referring again to FIG. 2, the fields include an OP-mode field for separating the various types of broadcastings (e.g., video, music, data), a Sid field for storing sub channel identifier information, and additional fields as needed. A desired broadcasting channel may be selected using the fields.

The management information 15 includes information for user channel management. As shown in FIG. 5, the channel management information 15 includes a history field, a preset field, and a user set field. The history field is used to display a previously-received channel as an initial channel at the time of performing the TDMB. The preset field is used to distinguish the user preference channels from non-preference channels. The user set field is used to set a specific channel as a basic channel, such that the same channel may be received at the time of initially performing the TDMB.

Figure 6:
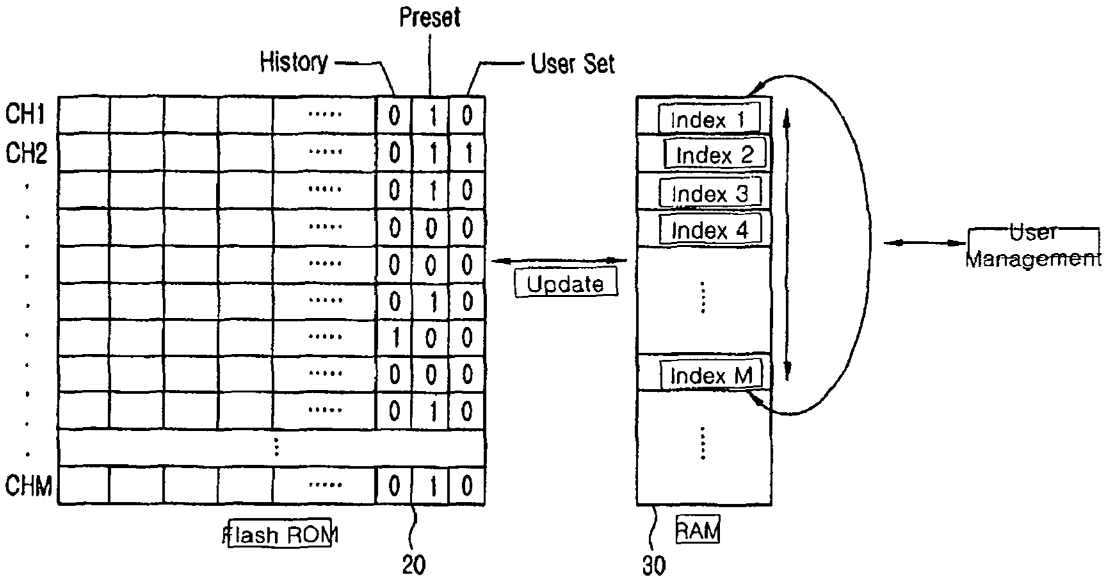
FIG. 6 is a diagram illustrating a conceptual view of operation of a channel information database and an index table, according to an embodiment of the present invention.

FIG. 6 is a diagram illustrating a conceptual view of operation of a channel information database and an index table, according to a first embodiment of the present invention.

Referring to FIG. 6, the channel information database is set to divide channel unit configuration information according to each channel. The index table 30 is set for performing channel switching and channel management by sorting user preference channels in the channel information database. The channel information database and the index table are each stored in a separate memory. That is, the channel information database 20 may be stored in a non-volatile memory 210, and the index table 30 may be stored in a volatile-memory 220 (e.g., a random access memory (RAM)).

The memories 210 and 220 shown in FIG. 3 may exist in various states. The states include initialization of the TDMB receiver to acquire information for related channels, generation of information for the channel information database 20 by the microprocessor unit 230, and completion of operations by the TDMB receiver.

A process for generating the channel information database 20 is described below.

Figure 7:
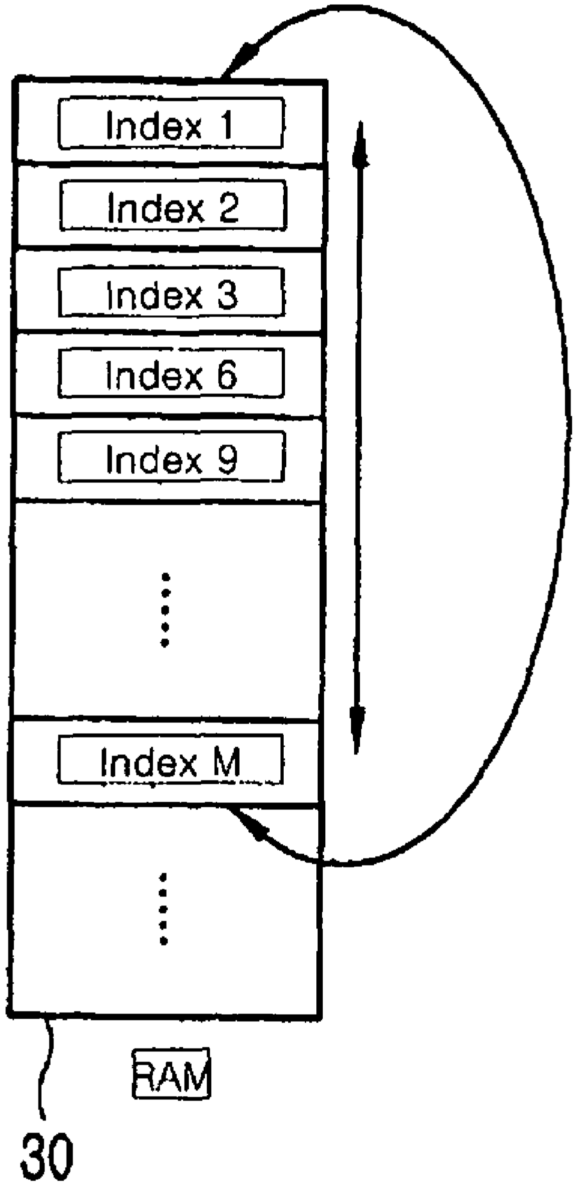
FIG. 7 is a diagram illustrating an example of setting the index table and an operation of the index table, according to an embodiment of the present invention.
Figure 8:
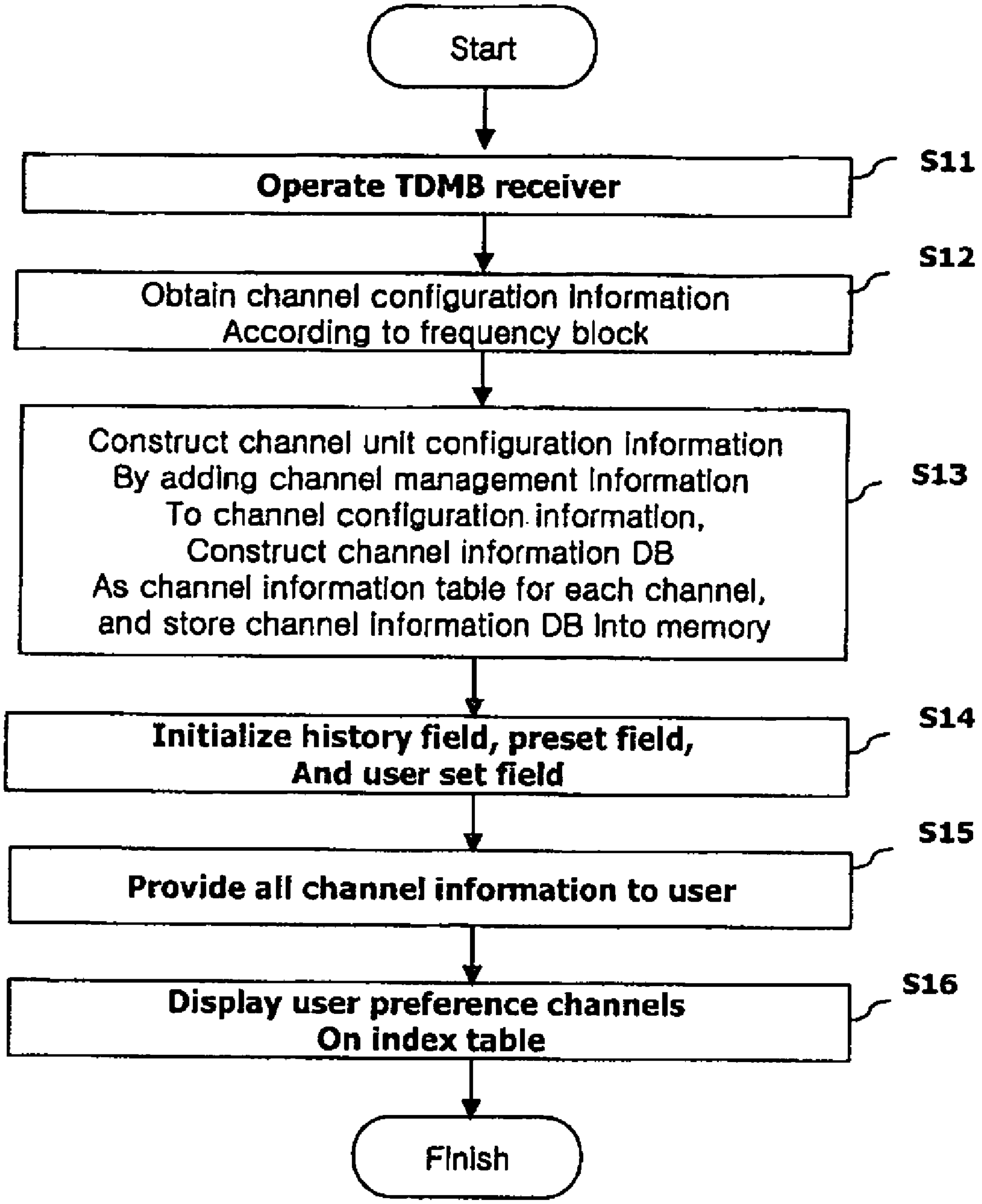
FIG. 8 is a flow diagram illustrating an initial operation for managing channels, according to an embodiment of the present invention.
Figure 9:
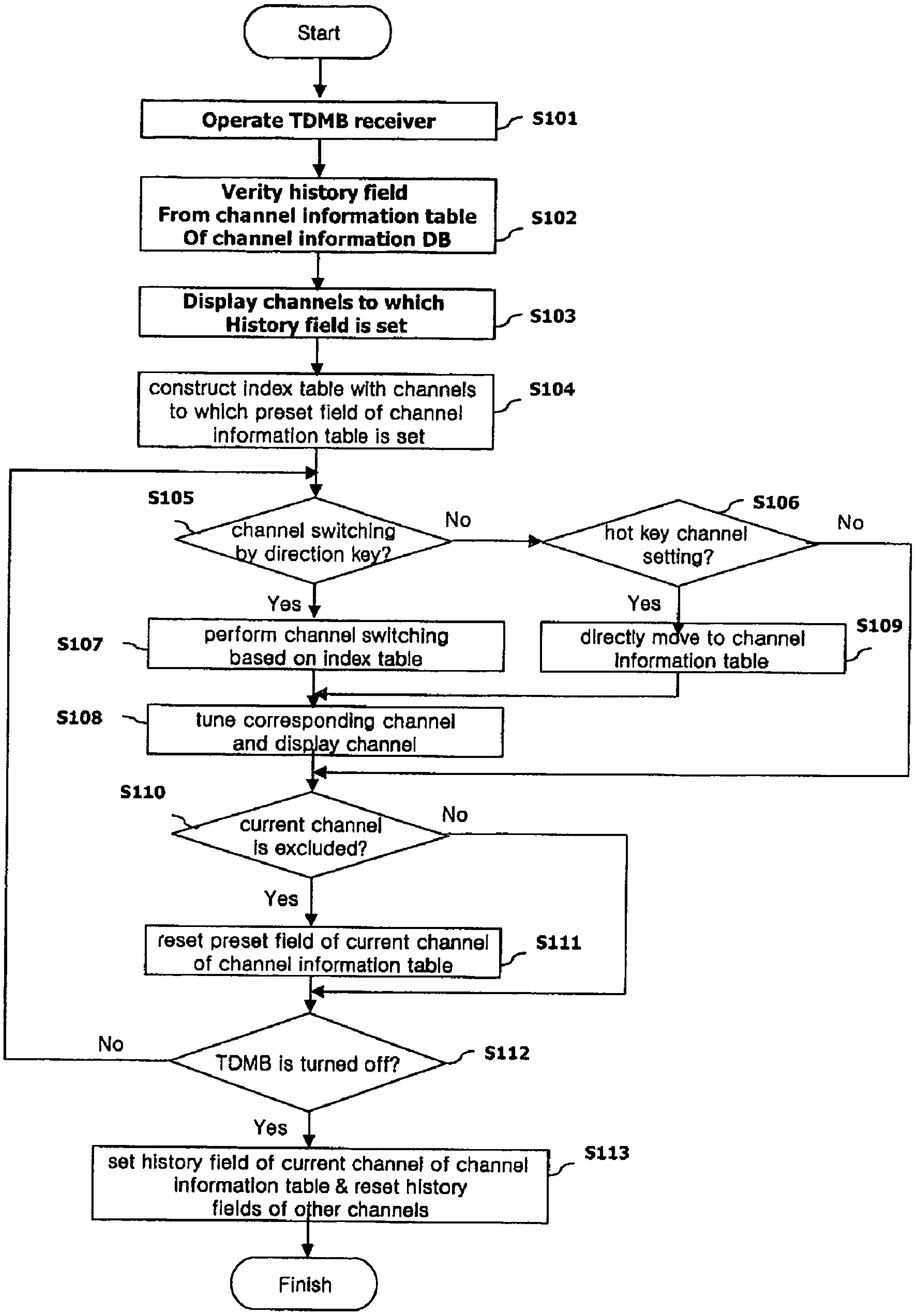
FIG. 9 is a flow diagram illustrating a further operation for managing channels, according to an embodiment of the present invention.

FIG. 7 is a diagram illustrating an example of setting the index table and an operation of the index table, according to the first embodiment of the present invention. FIG. 8 will be described in more detail below. FIG. 9 is a flow diagram illustrating an initial operation for managing channels, according to the first embodiment of the present invention.

Referring to FIG. 8, when the TDMB is driven (S11), an ensemble structure associated with a frequency block is analyzed to obtain channel configuration information (S12). Channel management information is then added to the channel configuration information to form the channel information DB that embodies the channel information database. The channel information DB is stored in the non-volatile memory (S13). The history field, the preset field, and the user set field are then respectively initialized (S14). The initialization may be performed at the time of storing the channel information database, for example.

Each of the fields may have one bit of information. The history field and the user set field may each have a reset initialized state, and the preset field may have a set initialized state. The preset field serves as a reference used to form the index table, in cases where the user performs channel switching by using a direction key, for example. When the TDMB receiver is initialized, the preset field may be set such that the user may perform channel switching with respect to the related channels.

Figure 1:
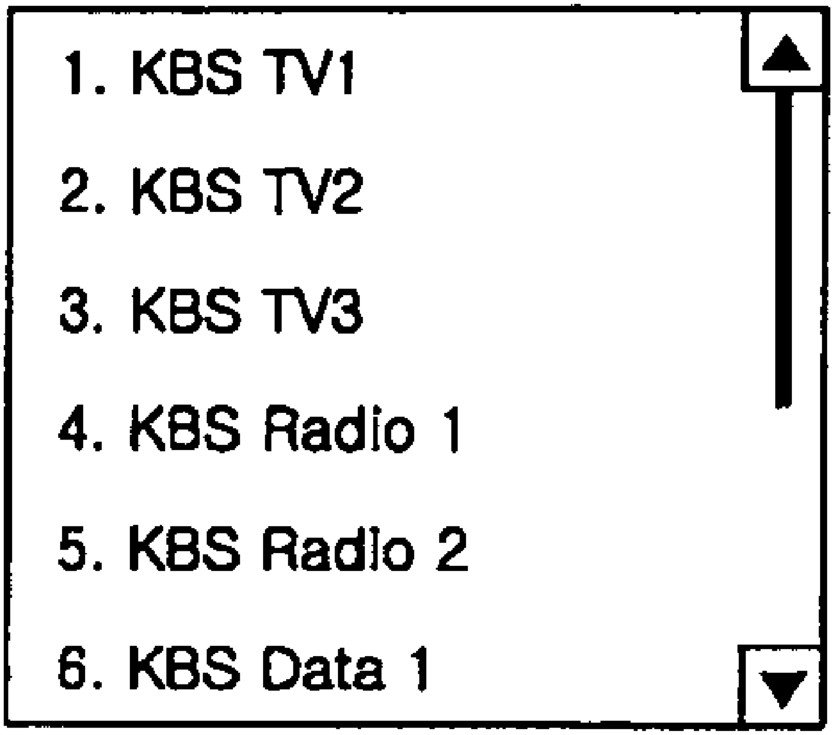
FIG. 1 RELATED ART
FIG. 1 is a diagram illustrating a channel list for setting a terrestrial DMB channel.

A channel list, such as that described with reference to FIG. 1, may then be provided to the user to enable the user to perform an initial channel selection (S15). The channel list may then preferably not be displayed unless a specific menu is selected. The contents of the selected channel are then displayed.

Referring again to FIG. 6, when the TDMB receiver is initialized, the history field included in the channel management information may be set to 0 (e.g., reset state), the preset field may be set to 1 (e.g., set state), and the user set field may be set to 0 (e.g., reset state).

Indexes having address information associated with channels to which corresponding fields are set may be constructed on the RAM in a table format, for example, based on contents of the preset field of the channel information database 20. The index table 30 may be generated accordingly. After the channel information database 20 is initialized, the index table 30 may be constructed to have M indexes, for example, to indicate the related channels (e.g., M channels). Thereafter, unless the TDMB receiver is reset by a power off/power on operation, or unless an additional update is performed, the constructed index table 30 may thus be used.

In cases where the user performs channel switching by a direction key, a pointer may be used on the index table 30 to indicate channels. By using the channel configuration information of the channel information database 20 that is indicated by the pointer, a selected channel may be displayed (S16, FIG. 8).

In cases where the user performs channel switching by using the index table 30 (e.g., by directly inputting the channel number), if a selected channel is a non-preferred channel (e.g., a non-preference channel), the corresponding channel may be deleted from the index table 30 by resetting the preset field associated with the corresponding channel on the channel information database 20. Referring again to FIG. 7, the index table shows that the user has set the channel 4, 5, 7, 8, and other channels that are not displayed in the index table 30, as non-preference channels.

The history field is used to re-display a previously-received channel when the TDMB receiver is reset by a power off/power on operation. When the TDMB receiver is powered off, the history field corresponding to the current channel is set and the history fields corresponding to other channels are reset.

The user set field is used to set a specific channel automatically whenever the TDMB receiver is powered on. Thus, when the user directly sets a specific channel as a basic channel, a user set field of the corresponding channel is set and basic channel setting fields of other channels are reset. Accordingly, initial channel reception by the history field and initial channel reception by the user set field may collide with each other, such that the user must select one of the two channels. The user set field is also used to receive functions required by broadcasting providers. When the TDMB receiver is powered on, the channel management information of the channel information database 20 shown in FIG. 6 is verified in order to set a new index table 30 on the RAM, as shown in FIG. 7.

Referring again to FIG. 6, the index table 30 is formed with channels to which the preset field has been set, such that the channels 4, 5, 7, and 8 are not included on the RAM. Accordingly, when the user performs channel switching by using the direction key, channel 6 (e.g., CH6) is selected after channel 3 (e.g., CH3) and channel 9 (e.g., CH9) is selected after CH6. The user may accordingly set the channel list to include only user preference channels.

Referring again to FIG. 6, when the user designates the user set field, channel 2 (e.g., CH2) may be displayed, for example. When the user designates the history field, channel 7 (e.g., CH 7) may be displayed, for example.

FIG. 9 is a flow diagram illustrating a further operation for managing channels, according to the first embodiment of the present invention. FIG. 9 shows the operation of the TDMB receiver by the user after the basic setting is completed, as shown in FIG. 8.

The present invention may be implemented in hardware, as described with reference to FIG. 4, above and/or in algorithm-based software, as described with reference to FIGS. 8 and 9, above.

Referring to again to FIGS. 2 to 9, when the user operates the TDMB receiver (S101), the history field of the channel information database 20 is verified (S102) and channels of the history field designated as 'set' are selected to be displayed (S103). The preset field of the channel information database 20 is then verified to form the index table 30 on the RAM 220, using only indexes that indicate set channels, for example (S104).

When the user performs channel switching by using the direction key (S105), channels corresponding to the indexes included in the table may be selected to be displayed on the basis of the index table 30 in the RAM 220 (S107). Then, a specific channel of the selected channels is tuned by using the channel configuration information of the channel information database 20. Broadcasting of the corresponding channel is then displayed on a display unit (S108).

On the other hand, if the user sets a channel by directly inputting a channel number by numeric keys (S106), information of the corresponding channel is directly obtained from the channel information database 20 and the corresponding channel is tuned to be displayed on the display unit (S109). The channel switching to a desired channel by directly inputting a channel number may be referred to as a hot key channel setting.

If a channel currently being received is a non-preference channel, the corresponding channel may be excluded by pressing a certain key (S110). The preset field in the channel information database 20 for the corresponding channel is then reset (S111).

After the above processes are performed, perhaps repeatedly, and the operation of the TDMB receiver is finished (S112), the history field in the channel information database 20 for the current channel is then set and the history fields of other channels are reset (S113).

In one embodiment, a method for managing channels in a mobile multimedia terminal comprises receiving ensemble information associated with a multimedia channel, and identifying the multimedia channel into a plurality of services based on the ensemble information. The method also comprises identifying service components required for reception of the plurality of services. The method also comprises determining a service type of each of the plurality of services, and organizing the plurality of services based on service types.

The organizing of the plurality of services based on the service types may further comprise receiving user service preference input from a user, and organizing the plurality of services based on the user service preference input. The organizing of the plurality of services based on the service types may also further comprise constructing a channel information database associated with the plurality of services based on the organizing of the plurality of services based on the service types, and forming an index table based on the channel information database. The method may further comprise providing the index table to a user to enable user channel switching. The service types may comprise a video channel type, an audio channel type, and a data channel type. The method may further comprise constructing a channel information database associated with the plurality of services based on the organizing of the plurality of services based on the user service preference input.

The method may further comprise performing the user channel switching in response to user input received via a direction key on a keypad. The method may also further comprise performing the user channel switching in response to user input of a channel number on a keypad. The mobile multimedia terminal may comprise a terrestrial digital multimedia broadcasting (TDMB) receiver.

In another embodiment, a method for managing channels in a mobile multimedia terminal comprises receiving ensemble information associated with a multimedia channel, and identifying the multimedia channel into a plurality of services based on the ensemble information. The method also comprises identifying service components required for reception of the plurality of services. The method also comprises receiving user service preference input from a user, and organizing the plurality of services based on the user service preference input.

The organizing of the plurality of services based on the user service preference input may further comprise constructing a channel information database associated with the plurality of services based on the organizing of the plurality of services based on the user service preference input, and forming an index table based on the channel information database. The method may further comprise determining a service type of each of the plurality of service, organizing the plurality of services based on service types, and constructing the channel information database associated with the plurality of services based on the organizing of the plurality of services based on the service types.

In yet another embodiment, a mobile multimedia terminal comprises a controller (e.g., microprocessor) adapted to receive ensemble information associated with a multimedia channel, to divide the multimedia channel into a plurality of services based on the ensemble information, and to identify service components required for reception of the plurality of services. The mobile multimedia terminal also comprises a first memory adapted to store a channel information database, the channel information database associated with the plurality of services. The mobile multimedia terminal also comprises a second memory adapted to store an index table, the index table formed based on the channel information database and provided to a user to enable the user to designate preferred services. The controller is adapted to control the index table based on the preferred services.

The channel information database may comprise a field adapted to designate a service type, and a history field adapted to store a service indicator to enable a previously broadcast service to be rebroadcast after the mobile multimedia terminal is reset. The channel information database may also comprise a preset field adapted to indicate whether a service is a preferred service or a non-preferred service, and a user set field adapted to set a specific service to be broadcast when the mobile multimedia terminal is reset.

The first memory may comprise a non-volatile memory. The second memory may comprise a volatile memory, such as a random access memory (RAM). The mobile multimedia terminal may further comprise a display unit adapted to display a service list stored in the index table, and a keypad comprising a direction key, the direction key adapted to enable the user to perform channel switching based on the service list. The mobile multimedia terminal may comprise a terrestrial digital multimedia broadcasting (TDMB) receiver.

The present invention enables a user to generate an index of preferred multimedia channels and/or subchannels (e.g., services). For example, the user may generate an index of 'Jazz' subchannels, or of 'TV' channels. In the embodiments of the present invention, a channel list for channel switching may be set on a volatile memory (e.g., a RAM) to enable fast access to a related user interface application. Furthermore, the channel list may be customized by the user to simplify channel searching. Additionally, channels may be categorized based on channel type (e.g., video, music, and/or data) to further simplify channel searching by presenting only channels of the desired channel type to the user.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method for displaying broadcast content in a mobile terminal having a multimedia broadcasting receiver, the method comprising:

receiving ensemble information associated with a plurality of services;

providing a list of the plurality of services based on the ensemble information;

identifying preset services from the list of the plurality of services responsive to a first user input;

identifying a last service of the plurality of services, the last service providing broadcast content which was last displayed on a display of the mobile terminal before the receiver was powered-off;

identifying a user defined service of the plurality of services, the user defined service providing broadcast content according to a selected first specific service set as a basic service to be received upon power-on of the receiver;

organizing and storing the identified preset services, last service and user defined service in memory associated with the receiver;

providing a user with an option to display the broadcast content relating to the last service or the broadcast content relating to the user defined service upon the power-on of the receiver; determining whether to display the broadcast content relating to the last service or to display the broadcast content relating to the user defined service based on user selection of the last service or the user defined service when the receiver is powered on;

displaying the broadcast content determined based on the user selection;

changing services of the receiver using only the identified preset services responsive to a second user input; and displaying broadcast content relating to one of the identified preset services as a result of changing the services of the receiver in response to the second user input.

2. The method of claim 1, further comprising:

storing the identified preset services as a data field of service management information in memory that is associated with the receiver.

3. The method of claim 1, further comprising:

generating an index table based upon the identified preset services, wherein the index table defines a service list of the identified preset services used for changing the services of the receiver.

4. The method of claim 3, further comprising:

storing the identified preset services and the last service in a first memory associated with the receiver; and storing the index table in a second memory associated with the receiver.

5. The method of claim 4, wherein the first memory is non-volatile memory and the second memory is volatile memory.

6. The method of claim 1, wherein the broadcast content comprises video, music, and data.

7. The method of claim 1, further comprising:

organizing the identified preset services based on a service type, the service type comprising video, music, and data.

8. The method of claim 1, wherein the identified preset services comprise a television service.

9. A mobile terminal, comprising:

a multimedia broadcasting receiver configured to receive broadcast content associated with a plurality of services and ensemble information associated with the plurality of services;

a controller configured to:

provide a list of the plurality of services based on the ensemble information;

identify preset services from the list of the plurality of services;

organize the identified preset services responsive to a first user input;

identify a last service of the plurality of services, the last service providing broadcast content which was last displayed when the receiver was powered-off;

identify a user defined service of the plurality of services, the user defined service providing broadcast content according to a selected first specific service set as a basic service to be received upon power-on of the receiver;

organize the identified preset services, last service and user defined service; store the organized identified preset services, last service and user defined service in a memory of the mobile terminal; display a user option to either display the broadcast content relating to the last service or display the broadcast content relating to the user defined service upon the power-on of the mobile terminal; and determine whether to display the broadcast content relating to the last service or to display the broadcast content relating to the user defined service based on user selection of the last service or the user defined service when the receiver is powered on; and a display configured to display the broadcast content determined by the user selection upon power-on of the receiver;

wherein the controller is further configured to change services of the receiver using only the identified preset services responsive to a second user input, such that broadcast content relating to one of the identified preset services is displayed on the display as a result of changing the services of the receiver in response to the second user input.

10. The mobile terminal of claim 9, wherein the identified preset services are stored as a data field of channel management information.

11. The mobile terminal of claim 9, further comprising:

an index table that is generated based upon the identified preset services, wherein the index table defines a service list of the identified preset services used for changing the preset services of the receiver.

12. The mobile terminal of claim 11, further comprising:

a second memory configured to store the index table.

13. The mobile terminal of claim 12, wherein the first memory is non-volatile memory and the second memory is volatile memory.

14. The mobile terminal of claim 9, wherein the broadcast content comprises video, music, and data.

15. The mobile terminal of claim 9, wherein the identified preset services are organized based on a service type, the service type comprising video, music, and data.

16. The mobile terminal of claim 9, wherein the identified preset services comprise a television service.

17. A method for displaying broadcast content in a mobile terminal having a multimedia broadcasting receiver, the method comprising:

receiving ensemble information associated with a plurality of services;

obtaining service configuration information from the ensemble information;

storing the service configuration information and service management information including information for user service management;

forming an index table based on the service configuration information and the service management information;

storing the index table;

displaying a service list stored in the index table;

displaying the broadcast content provided by a first specific service selected from the service list;

identifying a last service of the plurality of services, the last service providing broadcast content which was last displayed when the receiver was powered-off;

identifying a user defined service of the plurality of services, the user defined service providing broadcast content according to a selected first specific service set as a basic service to be received upon power-on of the receiver;

storing the user defined service in memory associated with the receiver; providing a user with an option to display the broadcast content relating to the last service or the broadcast content relating to the user defined service on a display of the mobile terminal upon power-on of the receiver; determining whether to display the broadcast content relating to the last service or to display the broadcast content relating to the user defined service based on user selection of the last service or the user defined service when the receiver is powered on; and displaying the broadcast content determined based on the user selection.

18. The method of claim 17, wherein the service management information further includes a history field that is used for displaying a previously received service as an initial service or for re-displaying the previously received service when the receiver is reset by a power-off/on operation.

19. The method of claim 17, wherein the service management information further includes a preset field that is used to distinguish user preferred services from non-preferred services based on a user setting.

20. The method of claim 19, wherein the index table includes the user preferred services indicated in the preset field.

21. The method of claim 19, further comprising switching services in response to a user input for switching from the selected first specific service to a second specific service, the user input comprising selection of the second specific service from the service list, the second specific service being one of the preferred services.

22. The method of claim 21, further comprising displaying a pointer on the service list to select the second specific service among the preferred services and receiving the user input via an input key of the mobile terminal which is used to control the pointer.

23. The method of claim 22, wherein the input key comprises a direction key.

24. The method of claim 21, further comprising receiving the user input via a keypad of the mobile terminal.

25. The method of claim 24, further comprising receiving the user input via a number key of the keypad, the number key corresponding to the second specific service selected from the service list.

26. The method of claim 17, wherein the service management information further includes a user set field that is used to set the selected first specific service as a basic service to be received upon power-on of the receiver.

27. The method of claim 17, further comprising: storing the last service in the memory associated with the receiver.

28. The method of claim 17, wherein the broadcast content comprises video, music, and data.

29. The method of claim 17, further comprising:

organizing the service list based on service types of services included in the service list, the service types comprising video, music, and data.

30. The method of claim 17, wherein the selected first specific service comprises a television service.

31. A mobile terminal, comprising:

a multimedia broadcasting receiver configured to receive ensemble information associated with a plurality of services;

a controller configured to:

obtain service configuration information from the ensemble information;

form an index table based on the service configuration information and service management information;

identify a last service of the plurality of services, the last service providing broadcast content which was last displayed when the receiver was powered-off; and identify a user defined service of the plurality of services, the user defined service providing broadcast content according to a selected first specific service set as a basic service to be received upon power-on of the receiver;

a memory configured to store the user defined service, the service configuration information, the service a display configured to display a service list stored in the index table and to display the broadcast content provided by a first specific service selected from the service list, wherein the controller is further configured to:

provide a user with an option to display the broadcast content relating to the last service or the broadcast content relating to the user defined service on the display upon power-on of the receiver; determine whether to display the broadcast content relating to the last service or to display the broadcast content relating to the user defined service based on user selection of the last service or the user defined service when the receiver is powered on; and cause the display to display the broadcast content determined based on the user selection upon power-on of the receiver.

32. The mobile terminal of claim 31, wherein the service management information further includes a history field that is used for displaying a previously received service as an initial service or for re-displaying the previously received service when the receiver is reset by a power-off/on operation.

33. The mobile terminal of claim 31, wherein the service management information further includes a preset field that is used to distinguish user preferred services from non-preferred services based on a user setting.

34. The mobile terminal of claim 33, wherein the index table includes the user preferred services indicated in the preset field.

35. The mobile terminal of claim 33, wherein the controller is further configured to switch services in response to a user input for switching from the selected first specific service to a second specific service, the user input comprising selection of the second specific service from the service list, the second specific service being one of the preferred services.

36. The mobile terminal of claim 35, wherein the display is further configured to display a pointer on the service list to select the second specific service among the preferred services, the mobile terminal further comprising an input key configured to receive the user input for controlling the pointer.

37. The mobile terminal of claim 36, wherein the input key comprises a direction key.

38. The mobile terminal of claim 35, further comprising a keypad configured to receive the user input.

39. The mobile terminal of claim 38, wherein the user input is received via a number key of the keypad, the number key corresponding to the second specific service selected from the service list.

40. The mobile terminal of claim 31, wherein the service management information further includes a user set field that is used to set the selected first specific service as a basic service to be received upon power-on of the receiver.

41. The mobile terminal of claim 33, wherein: the controller is further configured to identify the last service of the preferred services, the last service providing the broadcast content which was last displayed on the display before the receiver was powered-off, and to organize and store the last service in the memory.

42. The mobile terminal of claim 31, wherein the broadcast content comprises video, music, and data.

43. The mobile terminal of claim 31, wherein the controller is further configured to organize the service list based on service types of services included in the service list, the service types comprising video, music, and data.

44. The mobile terminal of claim 31, wherein the specific service comprises a television service.

* * * * *